May 14, 1957   A. W. CORWIN   2,791,908
POWER ACCUMULATING INTERMITTENT DRIVING MECHANISM
Filed Nov. 18, 1955   2 Sheets-Sheet 1
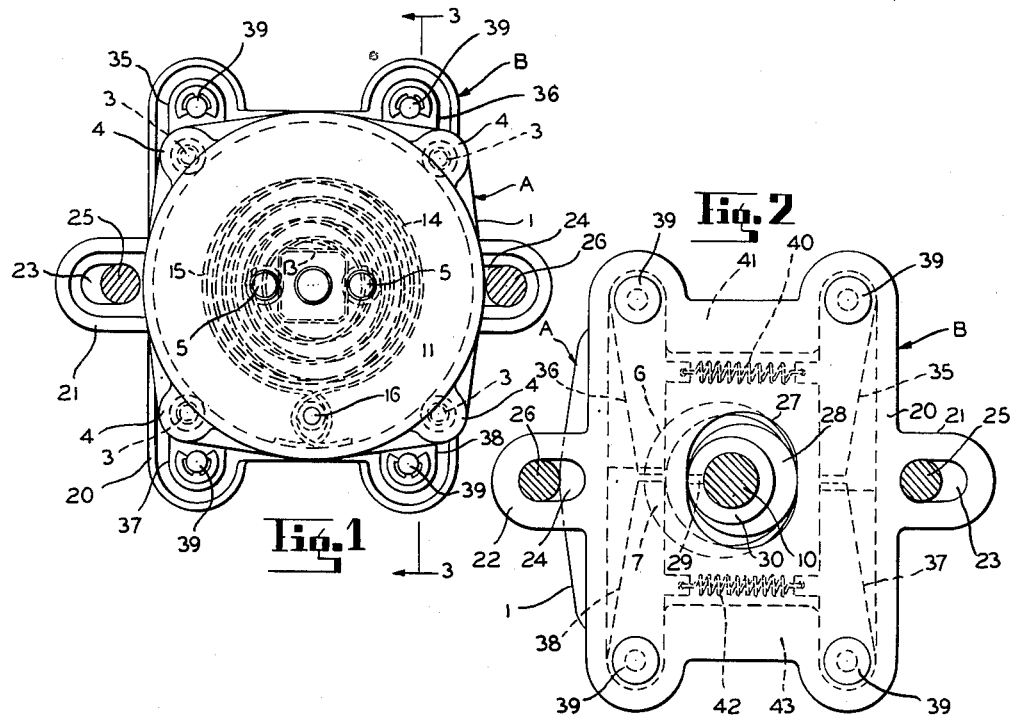
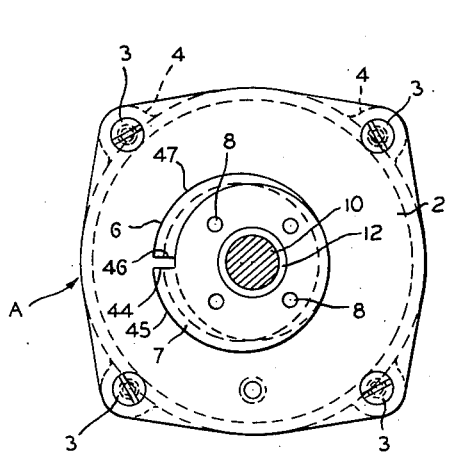
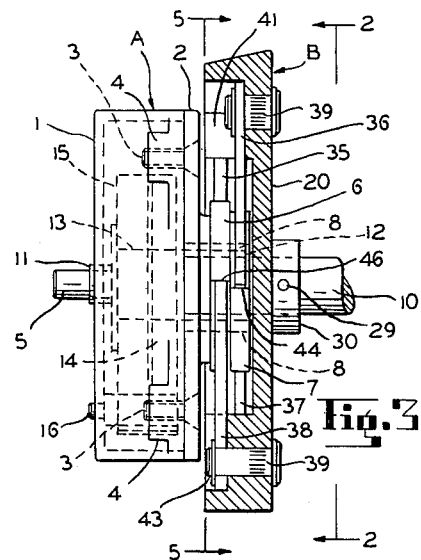
INVENTOR.
ALFRED W. CORWIN
BY
Chester W. Brown
ATTORNEY May 14, 1957     A. W. CORWIN     2,791,908
POWER ACCUMULATING INTERMITTENT DRIVING MECHANISM
Filed Nov. 18, 1955     2 Sheets-Sheet 2

*INVENTOR.*
ALFRED W. CORWIN
BY
Chester W. Brown
ATTORNEY

United States Patent Office 2,791,908
Patented May 14, 1957

2,791,908

POWER ACCUMULATING INTERMITTENT DRIVING MECHANISM

Alfred W. Corwin, Oak Creek, Wis., assignor to McGraw-Edison Company, a corporation of Delaware Application November 18, 1955, Serial No. 547,668

3 Claims. (Cl. 74—84)

This invention relates to new and useful improvements in power accumulating intermittent driving mechanism. More particularly, this invention is adapted for use in combination with a tap changing device for electrical transformers wherein the device is intermittently operated in either of two directions in response to variations in the electrical load imposed on the transformer.

Although this invention is useful in and overcomes problems encountered in transformer regulation, it will be understood that this invention is useful in any arrangement where intermittent delivery of power is desirable.

It is an object of this invention to provide a power accumulating connection between driving and driven members arranged for intermittent release of accumulated energy to the driven member while the driving member is in operation.

A further object is to provide a resilient flexible connection between driving and driven members and means automatically interrupting delivery of energy to the driven member in step-by-step sequence, storing energy during the interrupted delivery of energy, and releasing the energy thus stored for delivery to the driven member.

Another object is to provide between a reversible rotatable power driving shaft and a power driven shaft, an energy storing power transfer mechanism controlled by the driving shaft for intermittently operating the driven shaft in either direction of rotation of the driving shaft.

Other objects and advantages of the invention herein disclosed will become apparent from the following specification and accompanying drawings, in which Fig. 1 is a view as seen from the left relative to Fig. 3.

Fig. 2 is a view as seen from the right relative to Fig. 3.

Fig. 3 is a view in side elevation showing the device of Fig. 1 partly in section.

Fig. 4 is a view of a portion of the device taken as viewed from the right on the line 5—5 relative to Fig. 3.

Figure 5:
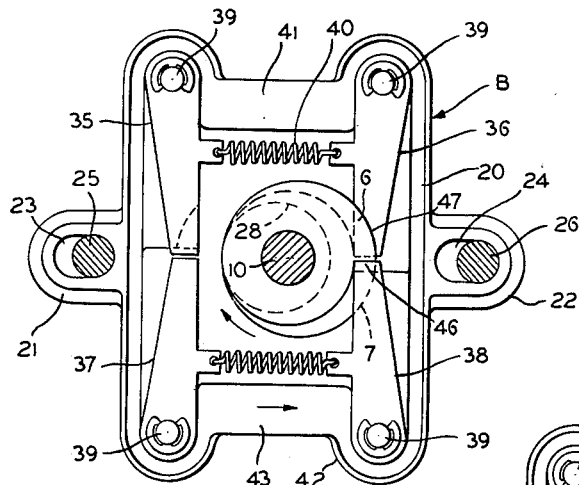
Fig. 5 is a view, partly in section, taken on the line 5—5 of Fig. 3, illustrating the relationship of the elements in one position.

The mechanism herein disclosed may be considered as embodying two interacting parts, namely, a rotatable energy accumulating section A and a reciprocatable, non-rotatable intermittent energy releasing section B.

The energy accumulating section A includes a circular housing 1 and a cover plate 2 secured to the housing by means of bolts 3 threaded into the ears 4 on the housing. In the illustrated embodiment, the housing 1 is provided with two projecting pins 5 secured thereto and spaced from each other equidistantly on radially opposite sides of the axis of rotation of the housing for engagement with a Geneva gear (not shown). In the disclosed embodiment, the pins 5 comprise power take off means but it will be understood by those skilled in the art that such output means may be in other well known forms such as a shaft, not shown, secured to and rotatable with the housing. A pair of latching cams 6 and 7 are secured adjacent each other to the exterior face of the cover plate 2 by means of pins 8 or other suitable elements. As will be seen from Figs. 5, 6 and 7, the cams 6 and 7 are arranged in opposition for reasons which will be later explained.

A power input shaft 10 extends through the section B and the cover plate 2 and into the housing A. This shaft is coaxial with the housing and is provided with a bearing stud 11 at one end and an enlarged bearing portion 12 in the cover plate 2 and latching cams 6 and 7. Interiorly of the housing 1, the shaft 10 is square in cross-section as indicated at 13. Two flat wire springs 14 and 15 are disposed side by side in the housing and encircle the portion 13 of the shaft 13. Both springs are attached at one end to the portion 13 and at the other end to the anchor pin 16 which extends through the housing A and cover plate 2.

As viewed in Fig. 1, the spring 14 describes a spiral path generated in a clockwise direction extending from the portion 13 on the shaft 10 to the pin 16 and the spring 15 describes a spiral path generated extending in a counter-clockwise direction from the portion 13 of the pin 16. Preferably, these springs are placed under an initial balanced tension equal to that super-imposed on each spring by rotation of the shaft through an angle of 180°. Thus, rotation of the shaft 10 in a counter-clockwise direction relative to the housing, will place the spring 14 under additional tension and place the spring 15 under less tension than the original or normal tension to which the springs are subject. The opposite result will be obtained if the shaft 10 is rotated in a clockwise direction relative to the housing A. That is, the spring 15 will be placed under greater tension and the spring 14 under less tension.

The energy releasing section B comprises a dished plate 20 having oppositely disposed ears 21 and 22 provided respectively with elongated slots 23 and 24. In the drawings, the median line common to the slots substantially coincides with the axis of the shaft 10. Circular supporting rods 25 and 26 extend through the slots 23 and 24, respectively, and are affixed to a stationary support (not shown). The diameter of each rod is substantially the same as the width of the slot in which it is received. Thus, the plate 20 is slidably supported on the rods 25 and 26 and is movable radially of the shaft 10 from one position to another alternately.

As clearly indicated in Fig. 2, the plate 20 is provided with an oval opening 27 surrounding the shaft 10 and having its major axis substantially perpendicular to the median line of the slots 23 and 24. Disposed in the opening 27 is an actuating cam 28 mounted on the shaft and fixed thereon by means of a set screw 29 in collar 30 integral with the cam 28. As the shaft 10 rotates, the actuating cam 28 revolves in the oval opening 27 in the plate 20 and causes the plate to reciprocate radially of the shaft in a horizontal direction relative to Figs. 1 and 2.

Mounted within the plate 20 are four latch members 35, 36, 37 and 38, each of which is pivotally mounted at one end on a stud pin 39 individual to each latch member and secured to the plate 20. Latch members 35 and 36 are biased toward each other by a spring 40 connected thereto and are limited in their biased movement by the shoulder 41 on the plate 20 extending between the members 36 and 37. Likewise, the latch members 37 and 38 are biased by spring 42 and limited in their movement toward each other by the shoulder 43 on the plate.

Figure 6:
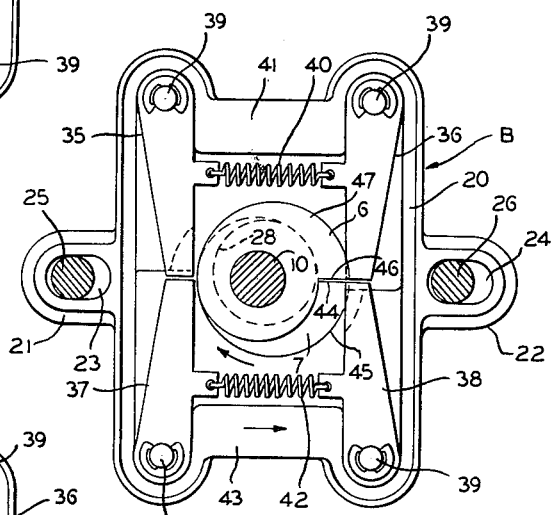
Fig. 6 is a view similar to Fig. 5 illustrating the relationship of the elements in another position.
Figure 7:
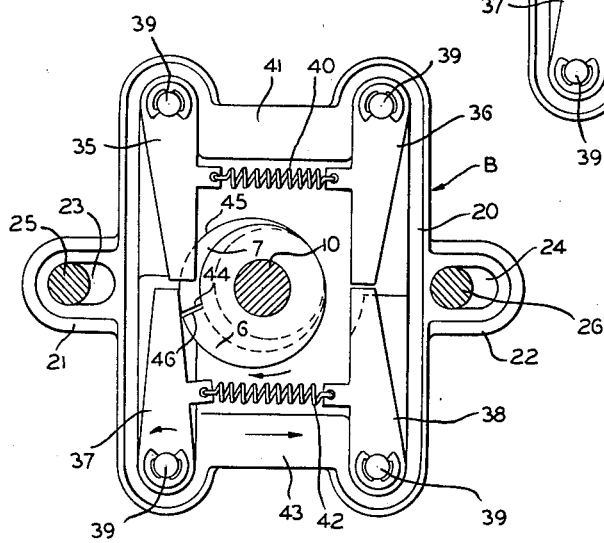
Fig. 7 is a view similar to Fig. 5 illustrating the relationship of the elements in a third position.

Diagonally disposed levers 36 and 37 are positioned in a common plane coincident with the latching cam 7 so that they are alternately engageable with the shoulder 44 at the end of the cam surface 45 as the cam 7 is rotated in a counter-clockwise direction relative to Figs. 5 through 7. Likewise the diagonally disposed levers 35 and 38 are positioned in a plane common thereto and to the latching cam 6 and alternately engage the shoulder 46 at the end of the cam surface 47 as the cam 6 rotates in a clockwise direction. Thus, assuming that the shaft 10 is rotating in a clockwise direction as indicated by the arcuate arrows concentric with the latching cams, then, starting with the relative position of the elements as shown in Fig. 5, the latching lever 38, by reason of its engagement with the shoulder 46 on the cam 6, will hold the housing 2 against clockwise rotation. In doing so, the spiral spring 15 in the housing will be wound under increasing tension and the spiral spring 14 will correspondingly be relieved of tension. As the shaft 10 continues its rotation, it carries the cam 28 in the same direction of rotation, that is, clockwise relative to Fig. 5 but counter-clockwise as viewed in Fig. 2.

As the cam 28 approaches a position 180° from that shown in Fig. 2, it moves the plate 20 toward the left in Fig. 2 and toward the right in Fig. 5. This movement of the plate, by reason of engagement of the shoulder 41 with the levers, carries the latching levers 36 and 38 from latching position shown in Fig. 5 toward the position indicated in Fig. 6. Continued movement of the plate will carry the levers 36 and 38 to disengage the cams, whereupon the spring 15 takes over and rapidly rotates the housing 2 until the latching lever 35 engages the shoulder 46 on the cam 6. Fig. 7 shows the lever 35 in position just prior to its engagement with the shoulder 46. When the lever 35 and shoulder 46 are engaged, the lever 37 will drop into place adjacent the shoulder 44 on the cam 7.

If the shaft 10 continues to rotate in a clockwise direction, the same sequence of operation transpires until the relative position of the elements is assumed as shown in Fig. 5. Thus, continued rotation of the shaft, as indicated, will produce an intermittent rotation of the housing 2 in the same direction of rotation.

Conversely, if the shaft 10 rotates in a counter-clockwise direction relative to Fig. 5, clockwise relative to Fig. 2, the latching levers 36 and 37 alternately engage the shoulder 44 on the cam 7 and hold the housing 2 stationary while the spring 14 is tensioned and the spring 15 is relieved of tension.

As previously noted, the power take off means shown in the embodiment of my invention comprises diametrically opposed pins 5 engageable with a Geneva gear (not shown). However, it will be obvious to those skilled in the art, that the power take off means may be in other desired forms such as a shaft (not shown) connected to the housing 2 or gearing (not shown).

Although I have disclosed only a single embodiment of my invention, it will be understood by those skilled in the art that modifications may be made without departing from the spirit of the invention or the scope of the following claims which I desire to secure by Letters Patent.

I claim:

1. In a power transmitting device, a power delivery shaft rotatable in either of two directions and a power take off member rotatable concentrically about the axis of said shaft in either of said two directions, in combination with a pair of springs each describing a spiral path about said axis, certain of the corresponding ends of said springs connected to said shaft and the other corresponding ends connected to said member, the spiral path of one of said springs being generated in a direction opposed to one direction of rotation of said shaft and the spiral path of the other of said springs being generated in a direction opposed to the other direction of rotation of said shaft, releasable latching mechanism biased to normally hold said member against rotation in either of said directions of rotation, latch releasing means controlled by said shaft and operable to release said latching means subsequent to a predetermined angular rotation of said shaft in either of said directions of rotation thereof.

2. A power transmitting device comprising in combination, a rotatable shaft, a power take off member rotatable about the axis of said shaft, a spring describing a spiral path about said axis radially thereof, the inner end of said spring being secured to said shaft and the outer end being anchored to said member, the spiral path of said spring being generated in a direction opposed to the direction of rotation of said shaft, a latching cam secured to said take off member and disposed about said shaft and having a cam surface terminating in a shoulder extending radially of the axis of said shaft and facing in a direction about said shaft opposed to the direction of the spiral path of said spring, a non-rotatable member disposed about said shaft and supported for reciprocation in a plane coincident with the axis of said shaft, two latching levers pivotally carried by said non-rotatable member each disposed on a side of said shaft radially opposite that of the other and extending toward said plane, said levers biased into the path of movement of said latching cam and disposed for engagement with said shoulder, and interacting cam means on said shaft and non-rotatable member whereby reciprocation of said non-rotatable member disposes each lever in the path of movement of said shoulder while removing the other lever therefrom, alternately.

3. A power transmitting device comprising in combination, a shaft rotatable in either of two directions, a power takeoff housing surrounding one end of said shaft and rotatable about the axis thereof, a pair of springs in said housing relatively displaced longitudinally of said shaft and each describing a spiral path about said axis radially thereof, the inner ends of said springs being secured to said shaft and the outer ends being anchored to said housing, the spiral path of one spring being generated in a direction opposed to one direction of rotation of said shaft and the spiral path of the other spring being generated in a direction opposed to the other direction of rotation of said shaft, a pair of latching cams secured to the exterior of said housing in displaced relation longitudinally of said shaft and disposed thereabout, one of said latching cams having a cam surface terminating in a shoulder extending radially of the axis of said shaft and facing in a direction about said shaft opposed to the spiral path of said one spring and the other of said latching cams having a cam surface terminating in a shoulder extending radially of the axis of said shaft and facing in a direction opposed to the spiral path of said other spring, a plate disposed about said shaft in a plane radially thereof and supported for reciprocation in a plane coincident with the axis of said shaft, two pairs of latching levers pivotally carried by said plate and extending toward said plane coincident with said axis, a biasing spring connecting the levers of each pair and urging said levers toward each other, stop means on said plate defining the limit of biased movement of said levers, certain corresponding levers of each pair being disposed to engage the shoulder on one latching cam and the other corresponding levers of each pair being disposed to engage the shoulder on the other latching cam, said plate having an ovate opening about said shaft, and a plate reciprocating cam secured to said shaft and disposed in said opening.

References Cited in the file of this patent

UNITED STATES PATENTS

| 1,891,101 | Le Count | Dec. 13, 1932 |
| 2,009,383 | Blume | July 30, 1935 |
| 2,227,133 | Hall | Dec. 31, 1940 |
| 2,460,000 | Flanagan | Jan. 25, 1949 |

FOREIGN PATENTS

| 5,833 | Great Britain | Dec. 21, 1883 |